United States Patent [19]

Factor et al.

[11] Patent Number: 4,863,520
[45] Date of Patent: Sep. 5, 1989

[54] METHOD FOR CURING SILICONE COATINGS ON PLASTIC SUBSTRATES, AND CURABLE COMPOSITIONS RELATED THERETO

[75] Inventors: Arnold Factor, Scotia; Gautam A. Patel, Clifton Park, both of N.Y.

[73] Assignee: General Electric Company, Schenectady, N.Y.

[21] Appl. No.: 214,964

[22] Filed: Jul. 5, 1988

[51] Int. Cl.$^4$ .................................................. C09K 3/00
[52] U.S. Cl. .................................................. 106/287.12
[58] Field of Search ..................... 106/287.12, 287.13

[56] References Cited

U.S. PATENT DOCUMENTS

| | | | |
|---|---|---|---|
| 2,906,734 | 9/1959 | Clark | 528/33 |
| 3,160,601 | 12/1964 | Hyde | 502/167 |
| 3,986,997 | 10/1976 | Clark | 428/412 |
| 3,997,496 | 12/1976 | Razzano | . |
| 4,027,073 | 5/1977 | Clark | 428/412 |
| 4,159,206 | 6/1979 | Armbruster et al. | 106/287.12 |
| 4,277,287 | 7/1981 | Frye | 106/287.12 |
| 4,431,771 | 2/1984 | Falender et al. | 524/863 |
| 4,486,567 | 12/1984 | Bowman et al. | 524/863 |
| 4,555,545 | 11/1985 | Kimura et al. | 524/588 |
| 4,724,004 | 2/1988 | Saito | 106/287.12 |

*Primary Examiner*—Theodore Morris
*Attorney, Agent, or Firm*—William H. Pittman; James C. Davis, Jr.

[57] ABSTRACT

An improved method for forming a protective coating on a plastic substrate is disclosed, comprising the application of a curable coating composition which contains at least one alkyltrialkoxysilane in a water/organic solvent dispersion of the colloidal silica onto the substrate, and then curing the composition at elevated temperatures with an effective amount of a tetrabutylammonium carboxylate catalyst such as tetra-n-butylammonium acetate. This invention also includes improved curable silicone coating compositions containing such a catalyst.

10 Claims, No Drawings

METHOD FOR CURING SILICONE COATINGS ON PLASTIC SUBSTRATES, AND CURABLE COMPOSITIONS RELATED THERETO

BACKGROUND OF THE INVENTION

This invention relates generally to protective coatings for plastic articles and to methods for curing such coatings.

Engineering resins are well-known, commercially available materials possessing physical and chemical properties which are useful in a wide variety of applications. For example, polycarbonate has replaced glass in many products because of its excellent breakage resistance. Exemplary products made from polycarbonates include automobile headlamps and stoplight lenses; safety shields in windows, architectural glazing, and the like. However, a major defect exhibited by plastics such as polycarbonates is their very low scratch-resistance.

Scratch-resistant coatings for plastics have been available in the prior art. As an example, H. Clark discloses a protective coating composition for transparent plastics in U.S. Pat. No. 4,027,073. These coatings contain a dispersion of colloidal silica in a lower aliphatic alcohol-water solution of the partial condensate of a silanol. The composition is maintained at a pH in the range of 3.0 to 6.0.

As another example, B. Anthony, in U.S. Pat. No. 4,624,870, discloses novel silica-containing coating compositions having an alkaline pH and stabilized by the use of a base which is volatile at curing temperatures.

In U.S. Pat. No. 4,159,206, Armbruster et al. describe colloidal silica-based coatings which use a mixture of dialkyldialkoxysilanes and alkyltrialkoxysilanes.

In an improvement to the coatings described by Armbruster et al., G. Patel teaches a silica-containing curable coating composition containing a silane mixture and ammonium-stabilized colloidal silica having an average particle diameter no greater than about 5-10 microns, as described in application Ser. No. 185,594, filed Apr. 25, 1988, and assigned to the assignee of the presently-described invention.

As disclosed in the Patel application, the cure of silane-based protective coatings is enhanced by the use of a cure catalyst. Many types of cure catalysts are available in the art, as shown by some of the above-mentioned disclosures. However, recent movement in the industry toward greater processing efficiency in preparing coated articles such as glazing has created the need for much better cure performance. Such performance can be measured by the achievement of lower cure temperatures or shorter cure times. The catalyst must still fulfill other requirements, such as not adversely affecting the weathering properties of the coating after cure.

It is therefore an objective of the present invention to provide an improved method for curing colloidal silica-based silicone coating compositions.

It is another objective of this invention to provide a highly effective cure catalyst for colloidal silica-based silicone coating compositions which does not adversely affect any of the properties of the composition after cure.

It is yet another objective of this invention to provide silicone-based curable coating compositions which are characterized by high cure rates.

DETAILED DESCRIPTION OF THE INVENTION

The above-mentioned objectives are accomplished by the discovery that tetrabutylammonium carboxylate catalysts of the formula

are highly effective cure catalysts for the silicone resin coatings described below. In formula I, R is selected from the group consisting of hydrogen, alkyl groups containing about 1 to about 8 carbon atoms, and aromatic groups containing about 6 to 20 carbon atoms. In preferred embodiments, R is a group containing about 1 to 4 carbon atoms, such as methyl, ethyl, propyl, butyl, and isobutyl. Exemplary catalysts of formula I are tetra-n-butylammonium acetate (TBAA), tetra-n-butylammonium formate, tetra-n-butylammonium benzoate, tetra-n-butylammonium-2-ethylhexanoate, tetra-n-butylammonium-p-ethylbenzoate, and tetra-n-butylammonium propionate. In terms of effectiveness and suitability for the present invention, the preferred cure catalysts are tetra-n-butylammonium acetate and tetra-n-butylammonium formate, with tetra-n-butylammonium acetate being most preferred.

Based on the above-mentioned discovery, a primary aspect of the present invention is an improved method for forming a protective coating on a plastic substrate, comprising applying onto the substrate a curable coating composition which comprises a dispersion of:
 (I) colloidal silica;
 (II) at least one alkyltrialkoxysilane; and
 (III) any reaction products of (I) and (II), in a mixture of water with at least one organic solvent.

Reaction products of (I) and (II) include those products formed during the hydrolysis reaction which converts the silanes to the corresponding silanols, as well as including those products formed during the subsequent condensation reaction which forms silicon-oxygen-silicon bonds. As further described by Patel in Ser. No. 185,594, complete condensation usually does not occur. Therefore, a portion of the coating composition is often referred to as a "partial condensate", i.e., a partial condensate of the silanols.

As described herein, preferred embodiments include a hydrolysis catalyst in the coating composition.

As also described below, another aspect of this invention is an improved curable silicone coating composition which includes a tetrabutylammonium carboxylate catalyst of formula I. The composition is characterized by an unexpectedly high cure rate when applied to and heated on a plastic substrate.

Some of the coating compositions suitable for use in the present invention will now be described. One such coating composition has an alkaline pH and comprises:
 (A) about 60% to 90% by weight of an alkyltrialkoxysilane;
 (B) about 10% to about 40% by weight solids of colloidal silica in a water/organic solvent dispersion of ammonium-stabilized colloidal silica; and
 (C) an effective amount of a hydrolysis catalyst; it being understood that the water/organic solvent dispersion is usually formed in situ as all of the individual reagents are mixed. In preferred embodiments for this composition, about 70% to 80% by weight of the alkyltrialkoxysilane is used, and about 20% to 30% by weight solids of the colloidal silica is used. Furthermore, the preferred alkyltrialkoxysilane is methyltrimethoxysilane, and the most suitable pH of the coating composition is usually about 7.1 to about 7.8. This composition is generally described in B. Anthony's U.S. Pat. No. 4,624,870, incorporated herein by reference.

The organic solvents used are usually alcohols (e.g., methanol) or glycol ethers (e.g., one of the Cellosolve ® solvents) The organic solvent is usually added to the reaction mixture, although alcohol is also formed during hydrolysis of the silane component in the composition.

Water/organic solvent dispersions are further described in the G. Patel application mentioned above, and in U.S. Pat. No. 4,624,870. The volume ratio of water to total solvent usually ranges from about 20:80 to about 40:60. An exemplary solvent mixture includes a higher-boiling component such as glycol ether or n-butanol with a lower boiling component like isopropanol in a volume ratio of from about 30:70 to about 70:30.

Various methods for the formation of curable coating compositions of this type are described at length in the Anthony patent, and therefore do not require an exhaustive description herein. Briefly, these coating compositions are usually prepared with an organotrialkoxysilane of the formula $R'Si(OR'')_3$, wherein $R'$ is a monovalent radical selected from the group consisting of alkyl groups containing about 1 to 3 carbon atoms and aryl groups containing about 6 to 13 carbon atoms, and $R''$ is a monovalent radical selected from the group consisting of alkyl groups containing about 1 to 8 carbon atoms and aryl groups containing about 6 to 20 carbon atoms. Furthermore, the colloidal silica is usually supplied as an aqueous dispersion. Ammonium-stabilized colloidal silica is often used, such as DuPont Company's Ludox AS or Nalco Chemical Company's Nalcoag 2326 and Nalcoag 2327. However, it should be understood that the colloidal silica may be stabilized by other basic materials, with the proviso that such bases be volatile at the temperature selected for curing the composition. For cure temperatures which generally range from about 75° C. to about 200° C. as further described below, suitable bases include alkyl amines containing from about 1 to 6 carbon atoms such as methylamine, ethylamine, t-butylamine, diethylamine, triethylamine, and ethylenediamine; and aromatic amines containing from about 5 to 7 carbon atoms, such as pyridine, aniline, and methylaniline.

In preferred embodiments for this type of coating composition, a hydrolysis catalyst is included. The catalyst, which helps to sustain the hydrolysis of the silanes, is usually an acid, such as those described in S. Schroeter et al.'s U.S. Pat. No. 4,239,798, incorporated herein by reference. Suitable acids include hydrochloric, acetic, chloroacetic, citric, phenylacetic, formic, propionic, glycolic, malonic, toluenesulfonic, and oxalic. Acetic acid and formic acid are the preferred hydrolysis catalysts. In terms of cost, availability, effectiveness, and ease of use, acetic acid is most preferred. Furthermore, the catalyst can be used undiluted or in the form of an aqueous solution.

The hydrolysis catalyst is present in an effective amount, i.e., an amount low enough to maintain the alkaline pH, but high enough to catalyze the formation of the coating composition. This amount is usually about 0.5% to about 1.5% by weight, based on the total weight of the silanes. Most often, about 1% by weight of the hydrolysis catalyst is preferred.

The advantages of these ammonium-stabilized types of coating compositions are described in the above-mentioned B. Anthony patent, and include hardness, flexibility, and improved weathering properties which are due to the use of the volatile base. The use of the cure catalysts of this invention greatly enhances practical applications of this coating composition because it can be cured so quickly.

Another suitable coating composition for this invention also has an alkaline pH and comprises:
(A) about 80% to 95% by weight of a mixture of a dialkyldialkoxysilane and an alkyltrialkoxysilane in a weight ratio within the range of about 1:99 to 15:85;
(B) about 5% to 20% by weight solids of colloidal silica in a water/organic solvent dispersion of ammonium-stabilized colloidal silica; and
(C) an effective amount of a hydrolysis catalyst, such as those described above.

Again, it should be understood that the water/organic solvent dispersion is usually formed in situ when all of the reagents are combined.

The colloidal silica for the composition of this embodiment preferably has an average particle diameter no greater than about 5 to about 10 millimicrons. This type of coating composition is generally described in the aforementioned application Ser. No. 185,594, incorporated herein by reference. In preferred embodiments, the dialkyldialkoxysilane is dimethyldimethoxysilane, and the alkyltrialkoxysilane is methyltrimethoxysilane. As described in the Patel application, this composition is particularly advantageous for use on thermoplastic articles which are to be shaped by thermoforming techniques, since the smaller-size colloidal silica results in better flexibility and crack resistance throughout a range of the dialkyldialkoxysilane level which could be employed.

Yet another type of alkyltrialkoxysilane-containing silicone resin coating composition suitable for the present invention is that which comprises, upon equilibration, a dispersion of colloidal silica in a lower aliphatic alcohol/water solution of the partial condensate of a silanol having the formula $R'''Si(OH)_3$, wherein $R'''$ is selected from the group consisting of alkyl groups containing about 1 to 3 carbon atoms, the vinyl group, the 3,3,3-trifluoropropyl group, the gamma-glycidoxypropyl group, the gamma-methacryloxypropyl group, and mixtures thereof. Such a coating composition is generally described in H. Clark's U.S. Pat. No. 3,986,997, the disclosure of which is incorporated herein by reference. The silanol for such a composition is usually derived from methyltrimethoxysilane. Furthermore, the colloidal silica dispersions used in this type of composition usually have a particle diameter in the range of about 5 to 150 millimicrons, and are often stabilized by the inclusion of sodium hydroxide. Unlike the other silicone coating compositions described above, this composition contains sufficient acid to provide a coating pH of about 3.0 to about 6.0. Acids used to maintain this pH can be those described in the Clark patent, such as hydrochloric, acetic, chloroacetic, citric, toluene-sulfonic, oxalic, and the like. Other details regarding the preparation and use of this type of composition are also described in U.S. Pat. No. 4,027,073, issued to H. Clark and incorporated by reference herein. While these acidic coating compositions may be useful for some applications, preferred embodiments of the present invention employ one of the alkaline coating compositions described previously.

A typical method for preparing a silicone coating composition as described above involves the premixture of the hydrolysis catalyst with the silane component, followed by addition of the aqueous colloidal silica, which optionally may contain a portion of the organic solvent being used. The temperature of the reaction mixture during these steps is usually kept in the range of about 20° C. to about 40° C., and preferably in the range of about 20° C. to about 25° C. A reaction time of about 4 to 6 hours is usually sufficient to hydrolyze the silane, such that the initial two-phase liquid mixture has been converted to a single liquid phase in which the colloidal silica is uniformly dispersed. Hydrolysis is preferably allowed to continue for another 12 to 18 hours, for a total equilibration period of from about 16 hours to 24 hours, although these time periods can vary somewhat. As a general rule, the longer the time permitted for hydrolysis, the higher the final viscosity of the coating composition. The organic solvent is usually added to the reaction mixture after hydrolysis is substantially complete.

Those of ordinary skill in the art appreciate that each of the coating compositions described above may contain various other well-known additives directed to specific property requirements. Exemplary additives include thickening agents, pigments, dyes, anti-oxidants, flow modifiers, and surface lubricants. One particularly useful additive for these types of compositions is an ultraviolet light (UV) absorber, such as those of the hydroxybenzophenone and benzotriazole series, as well as the cyanoacrylates or benzylidene malonates. Exemplary UV compounds are described by K. Benjamin in U.S. Pat. No. 4,544,582 and D. Olson et al. in U.S. Pat. No. 4,308,317, both incorporated herein by reference.

A particularly preferred ultraviolet light absorber is one capable of co-reacting with silanes, since such a material is less likely to volatilize from the coating composition during the heat-curing cycle. One very useful ultraviolet light absorbing agent of this type is a silylated compound having the formula

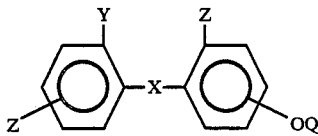

II wherein X is

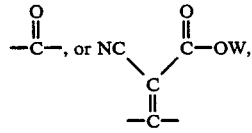

Y is H or OH; Z is H, OH, OQ or OW, wherein at least one Z in the ortho position is OH if Y is H; Q is $-CH_2(CH_2)_nSi(R'')_x(OR''')_y$, and W is $-C_mH_{2m+1}$, x is 0, 1 or 2, y is 1, 2, or 3, x+y=3, n=0, 1 or 2, m=1 to 18, R'' is an alkyl group having 1 to 6 carbon atoms, and each R''' is independently selected from the group consisting of alkyl or alkanoyl groups having 1 to 6 carbon atoms. The compound of formula II is described in U.S. Pat. Nos. 4,374,674 and 4,680,232 of Ashby et al. and Factor et al., respectively, both incorporated herein by reference. Examples of compounds of this type are provided in the referenced patents. These include 4-[gamma-(trimethoxysilyl)propoxy]-2-hydroxybenzophenone and 4-[gamma-(triethoxysilyl)propoxy]-2-hydroxy benzophenone. Mixtures of these UV absorbers can also be used.

One useful silylated UV absorber composition may be made by equilibrating a methanol solution of an ethoxy-substituted silylated UV absorbing agent of formula II, as taught in the Anthony patent described above. Those skilled in the art can easily determine the appropriate level of ultraviolet light absorber for a particular coating composition.

The tetrabutylammonium carboxylate catalyst of this invention is employed in an amount high enough to achieve a desired amount of hardness, as measured by the level of haze after abrasion. Excessive amounts of catalyst sometimes induce microcracking in the cured coating after weathering, and thus should be avoided. The catalyst concentration is usually about 0.1 to about 1.0 weight percent, based on coating solids. A preferred concentration range for most applications is about 0.3 to about 0.6 weight percent. The catalyst may be added to the composition during preparation, or may be post-added after such time.

The choice of substrate is not particularly critical to the present invention. It may be formed of a number of materials, such as polycarbonate, acrylic, polyphenylene ether, polysulfone, polyimide, polyamide, polyester, copolyestercarbonate, cellulose acetate, poly(diethylene glycol bis(allyl carbonate)), and copolymers of some of these materials, as well as multilayer (e.g., coextruded) articles which contain at least two of these polymers. Suitable substrates are also described in the Anthony patent mentioned above. For many applications, bisphenol A-based polycarbonate is the preferred substrate material because of its many excellent physical and chemical properties, one of which is transparency, if desired.

Although the coating composition of this invention can be applied directly to a substrate surface, the use of a primer is often desirable when high levels of adhesion are required. Exemplary primers are discussed in the above referenced B. Anthony patent, and in the application of J. C. Devins et al.'s Ser. No. 034,890, filed Apr. 6, 1987, the teachings of which are also incorporated herein by reference. Suitable primer materials include thermoplastic acrylics polymerized prior to being coated onto the substrate, such as those formed by polymerizing at least one monomer of an acrylic acid ester or a methacrylic acid ester. Thermoplastic acrylic materials are further described in S. Schroeter et al.'s U.S. Pat. No. 4,339,798. Copolymers formed from acrylate or methacrylate monomers are also possible. Polymethylmethacrylates and polyethylmethacrylates are the preferred primer materials for the article of this invention.

Acrylics which are ultraviolet radiation-curable can also be used as primers. Some of these materials comprise a polyfunctional acrylate monomer, an acryloxy functional silane, and, optionally, colloidal silica, as described in U.S. Pat. Nos. 4,372,835, 4,478,876, and 4,486,504, all incorporated herein by reference.

Thermosettable acrylic emulsions may also be used for the primer, such as a 50/50 by weight blend of two thermosettable acrylic emulsions supplied by the B. F. Goodrich Company: Hycar 237 and Hycar 256.

The primer system may further include effective amounts of a UV light absorbing compound such as those of the hydroxybenzophenone or benzotriazole type described in U.S. Pat. Nos. 4,239,798 and 3,043,709, the latter also being incorporated herein by reference.

Other additives can also be included in the primer, such as flatting agents, surface active agents, and thixotropic agents, all of which are well-known in the art and therefore do not require extensive discussion here. The primer composition can be applied and then cured or dried by various techniques, which are well-known in the art.

The coating composition containing the catalyst may be applied to the primed or unprimed substrate by various methods, such as flowing, spraying, dip coating, or roll-coating. Curing is carried out by heating the coated substrate at a temperature of from about 80° C. to about 130° C. for about 15 minutes to about 3 hours. A preferred temperature lies in the range of about 100° C. to about 130° C., while a preferred cure time ranges from about 30 minutes to about 60 minutes. Those skilled in the art will be able to select a particular time/temperature regimen based on various factors, such as the particular silane composition utilized and the thickness of the coating material on the substrate.

It should be apparent from above that another aspect of this invention includes a curable coating composition comprising at least one alkyltrialkoxysilane, a water/organic solvent dispersion of colloidal silica, and an effective amount of the tetrabutylammonium carboxylate cure catalyst of formula I. As also mentioned above, preferred compositions of this type have an alkaline pH and further include a hydrolysis catalyst. As demonstrated in the examples which follow, the primary advantageous property of these curable coating compositions are their unexpectedly high cure characteristics, as shown by reduced cure time and reduced catalyst level.

In order for those skilled in the art to better understand how the present invention may be practiced, the following examples are given by way of illustration, though not by way of limitation. All parts and percentages are given by weight, unless otherwise indicated.

EXAMPLE 1

Cure Catalyst Comparison

This example compares the effectiveness of a cure catalyst of the present invention with cure catalysts outside the scope of this invention in a silicone coating composition. The coating composition was prepared by mixing 406 grams of methyltrimethoxysilane, 294 grams of Nalcoag 1034-A colloidal silica (34 weight percent $SiO_2$ in $H_2O$, 20 millimicron diameter particle size, pH=3.2), and 40 grams of deionized water in a glass bottle. Since the reaction is highly exothermic, the glass bottle was immersed in cold water (about 15° C.) for about 30 minutes. This solution was stirred for 16 to 18 hours at room temperature, followed by the addition of 740 grams of an isopropanol/n-butanol (1:1 by weight) solvent blend and 25.7 grams of an ultraviolet light absorbing agent, while stirring The UV absorber was 4-[gamma-(tri-(methoxy/ethoxy)silyl)propoxy]-2-hydroxy benzophenone, with a methoxy/ethoxy ratio of about 85:15. The coating solution was allowed to age for 3 to 4 weeks before the catalyst evaluation. The coating material contained about 20% by weight solids, including about 8.5% by weight of the UV screener. The pH of the coating material was 3±1.

A representative sampling of catalysts which were studied in this experiment is provided in Table 1. Each catalyst was evaluated in the form of its acetate salt. For compounds in the hydroxide or free amine states, the acetate salts were prepared by co-addition of an equivalent amount of acetic acid. Salts containing other than acetate anions were converted to their acetate by passing them through a column containing 5 molar excess of an ammonium-based ion exchange resin in its acetate form.

The coating formulation described above was mixed with the catalyst at a concentration equivalent to 0.7 millimoles catalyst/100 grams resin solution. This material was then applied to bisphenol A-based polycarbonate plaques which had first been primed with a thermosettable acrylic material (0.2–0.5 micron cured thickness). After drying at room temperature for about 30 minutes, the primed substrate with the coating material thereon was cured for 45 minutes at 130° C.

The degree of cure was measured as abrasion resistance, using a combination of two ASTM test methods. The Taber abrasion test, ASTM D1044, was used with a 1000 gram total weight load evenly distributed on the two wear wheels. An evaluation was made at 300 cycles. The second test method was ASTM D1003, which uses a Gardner Hazemeter, Model UX 10. In this method, the percentage of light scattering is measured before and after the specimen is taber-abraded. The lower the final value, the better the abrasion resistance and hardness. The following results were obtained. The symbol "Ac" in the formulas below represents "acetate". The symbol "$\phi$" represents the phenyl group.

TABLE 1

Cure Catalyst Evaluation

| Catalyst Number | Catalyst Name/Formula | % Haze |
|---|---|---|
| 1 | Tetra-n-butylammonium acetate (TBAA) | 4.1 |
| 2 | $(CH_3)_4N^{\oplus\ominus}OAc$ | 5.1, 5.6 |
| 3 | $(C_3H_7)_4N^{\oplus\ominus}OAc$ | 5.0 |
| 4 | $(C_5H_{11})_4N^{\oplus\ominus}OAc$ | 4.8 |
| 5 | $(C_6H_{13})N^{\oplus\ominus}OAc$ | 4.9 |
| 6 | $(HOCH_2CH_2)_4^{\oplus\ominus}OAc$ | 25 |
| 7 | $(HOCH_2CH_2)_3N^{\oplus}(CH_3)^{\ominus}OAc$ | 6.5 |
| 8 | $(HOCH_2CH_2)_2N^{\oplus}(CH_3)_2^{\ominus}OAc$ | 5.5 |
| 9 | $HOCH_2CH_2N^{\oplus}(CH_3)_3^{\oplus}OAc$ | 5.6, 5.9 |
| 10 | $[(CH_3)_4N^{\oplus}]_2^{\ominus}O_4C_2$ | 13.5 |
| 11 | 1,8-Diazabicyclo[5.4.0]undec-7-ene.HOAc | 11.6 |
| 12 | 1,5-Diazabicyclo[4.3.0]non-5-ene.HOAc | 15.8 |
| 13 | $\phi CCH_2^{\oplus}N(CH_3)_3^{\ominus}OAc$ (with C=O) | 11 |
| 14 | $\phi N^{\oplus}(CH_3)_3^{\ominus}OAc$ | 21 |
| 15 | $\phi C(=O)-CH_2-N^{\oplus}(CH_3)-\phi^{\ominus}OAc$ | 21 |
| 16 | Dibutyltindiacetate | 25 |
| 17 | Tributylamine.HOAc | 40 |
| 18 | Morpholine.HOAc | 40 |
| 19 | Ammonium Acetate | 40 |
| 20 | Ammonium Formate | 40 |
| 21 | $\phi CH_2N^{\oplus}(CH_3)_3^{\ominus}OAc$ | 6.1 |
| 22 | $K^{\ominus\oplus}OAc$ | 5.4, 5.7 |
| 23 | $C_2H_5P^{\oplus}\phi_3^{\ominus}OAc$ | 5.9 |

The results in Table 1 demonstrate that a variety of catalysts perform quite differently in the silicone resin coating composition. TBAA provided the best cure, as shown by the low haze value.

EXAMPLE 2

Degree of Cure as a Function of Catalyst Concentration

The effectiveness of TBAA in comparison to some of the other catalysts which resulted in relatively low haze values in Example 1 was further evaluated here. The coating material used was an ammonium-stabilized composition prepared as follows: 203 grams of methyltrimethoxysilane was mixed with 1.25 grams of glacial acetic acid. In a separate operation, 125.5 grams of Ludox AS (ammonium-stabilized colloidal silica sol, 40% $SiO_2$ having a silica particle diameter of about 22 millimicrons and a pH of 9.2) was diluted with 41.5 grams of deionized water to reduce the $SiO_2$ level to 30 weight percent. This material was then added to the acidified methyltrimethoxysilane with stirring. The solution was then stirred for another 16–18 hours at room temperature, followed by the addition of 370 grams of a 1:1 (by weight) isopropanol/n-butanol solvent blend and 32.0 grams of the UV absorber used in Example 1. The mixture was then stirred for about 2 weeks at room temperature. The composition as formulated had 20% by weight solids, and contained 11% by weight of the UV absorber, based on calculated solids. The coating composition had a viscosity of about 5 centistokes at room temperature.

Bisphenol A-based polycarbonate substrates were primed with a polyethylmethacrylate-based material containing 2 parts by weight (pbw) Elvacite® 2042 (DuPont), 100 pbw Dowanol® EB solvent (Dow Chemical Company), and 4 pbw of a benzophenone-based UV screener. The primer was applied using flow coating techniques, and then dried at room temperature for 20 minutes, followed by drying for another 20 minutes at 130° C.

Each of the catalysts listed in Table 2 was then post-added to the silicone coating composition, which was itself then flow-coated onto the primed substrate. The coated substrate was then oven-heated for 15 minutes at 130° C. The degree of cure was measured according to the method described in Example 1. The following results were obtained.

TABLE 2

| Catalyst Concentration Evaluation | | |
|---|---|---|
| Catalyst | Concentration$^{(a)}$ | Haze$^{(b)}$ |
| Control (no catalyst) | — | 11.8 |
| Tetrabutylammonium acetate (TBAA) | 0.25 | 6.5 |
| Tetramethylammonium acetate | 0.5 | 6.4 |
| Tetramethylammonium acetate | 0.25 | 9.7 |
| Benzyltrimethylammonium acetate | 0.5 | 6.0 |
| Potassium acetate | 0.5 | 6.1 |
| Ethyltriphenylphosphonium acetate | 0.5 | 6.0 |

$^{(a)}$Millimole of catalyst per 100 grams coating solution.
$^{(b)}$After 300 Taber cycles.

The results in Table 2 demonstrate that TBAA provides a hardness and cure equivalent to that of the other catalyst compounds, even when used at half of their concentration.

While embodiments and applications of this invention have been shown and described, it will be apparent to those skilled in the art that modification are possible without departing from the concepts described herein. Therefore, this invention is not to be restricted except by way of the claims which follow.

What is claimed is:

1. A curable coating composition comprising:
   (A) a dispersion of
      (I) colloidal silica;
      (II) at least one alkyltrialkoxysilane of the formula R'Si (OR")$_3$, wherein R' is an alkyl radical containing about 1–3 carbon atoms and R" is an alkyl radical containing about 1–8 carbon atoms; and
      (III) any reaction products of (I) and (II), in a mixture of water with at least one organic solvent; and
   (B) an amount in the range of about 0.1–1.0 weight percent, based on coating solids of a tetrabutylammonium carboxylate cure catalyst of the formula

wherein R is selected from the group consisting of hydrogen, alkyl groups containing about 1 to about 8 carbon atoms, and aromatic groups containing about 6 to 20 carbon atoms.

2. The composition of claim 1 having a pH of about 7.1 to about 7.8.

3. The composition of claim 1 wherein the catalyst is tetra-n-butylammonium acetate of tetra-n-butylammonium formate.

4. The composition of claim 1 wherein the colloidal silica is ammonium-stabilized.

5. The composition of claim 4 comprising about 60–95% by weight of methyltrimethoxysilane and about 10–40% by weight solids of the colloidal silica.

6. The composition of claim 4 comprising about 80% to 95% by weight of a mixture of a dialkyldialkoxysilane and an alkyltrialkoxysilane in a weight ratio within the range of about 1:99 to 15:85, said colloidal silica having an average particle diameter no greater than about 5 to about 10 millimicrons.

7. The composition of claim 1 which further includes sufficient acid to provide a pH of about 3.0 to about 6.0.

8. The composition of claim 7 which upon equilibration comprises a dispersion of colloidal silica in a lower aliphatic alcohol/water solution of the partial condensate of a silanol having the formula R'Si(OH)$_3$, wherein R' is selected from the group consisting of alkyl groups containing about 1–3 carbon atoms, the vinyl group, the 3,3,3-trifluoropropyl group, the gamma-glycidoxypropyl group, and the gamma-methacryloxypropyl group.

9. The composition of claim 1 which further includes an effective amount of a hydrolysis catalyst.

10. The composition of claim 1 further including an effective amount of a silylated ultraviolet light absorber capable of co-reacting with the silane component.

* * * * *

UNITED STATES PATENT AND TRADEMARK OFFICE
CERTIFICATE OF CORRECTION

PATENT NO. : 4,863,520

DATED : September 5, 1989

INVENTOR(S) : Arnold Factor and Gautam A. Patel

It is certified that error appears in the above-identified patent and that said Letters Patent is hereby corrected as shown below:

Column 10, line 36 (claim 3), "of" should read --or--.

Signed and Sealed this

Fourth Day of September, 1990

Attest:

HARRY F. MANBECK, JR.

Attesting Officer

Commissioner of Patents and Trademarks